United States Patent
Bloch et al.

(10) Patent No.: US 7,246,351 B2
(45) Date of Patent: Jul. 17, 2007

(54) SYSTEM AND METHOD FOR DEPLOYING AND IMPLEMENTING SOFTWARE APPLICATIONS OVER A DISTRIBUTED NETWORK

(75) Inventors: Timothy J. Bloch, Sarasota, FL (US); Thomas L. Dietsche, St. Paul, MN (US); Richard D. Rubenstein, Minneapolis, MN (US)

(73) Assignee: Jargon Software, Minneapolis, MN (US)

( * ) Notice: Subject to any disclaimer, the term of this patent is extended or adjusted under 35 U.S.C. 154(b) by 843 days.

(21) Appl. No.: 10/081,921

(22) Filed: Feb. 20, 2002

(65) Prior Publication Data

US 2002/0129129 A1    Sep. 12, 2002

Related U.S. Application Data

(60) Provisional application No. 60/270,031, filed on Feb. 20, 2001.

(51) Int. Cl.
*G06F 9/445* (2006.01)

(52) U.S. Cl. .................... 717/175; 717/168; 717/169; 717/170; 717/171; 717/173; 717/174; 717/176; 717/177; 717/178; 715/700; 715/704; 715/710

(58) Field of Classification Search ........ 715/500–527, 715/710, 700, 704; 717/169–178; 707/104, 707/104.1–513; 705/14
See application file for complete search history.

(56) References Cited

U.S. PATENT DOCUMENTS

| | | | |
|---|---|---|---|
| 5,727,202 A | 3/1998 | Kucala ..................... 395/610 |
| 5,737,619 A * | 4/1998 | Judson ....................... 715/500 |
| 5,877,757 A | 3/1999 | Baldwin et al. | |
| 5,961,601 A | 10/1999 | Iyengar ....................... 709/229 |
| 5,978,833 A | 11/1999 | Pashley et al. ............. 709/200 |
| 5,978,834 A | 11/1999 | Simonoff et al. | |
| 5,987,476 A | 11/1999 | Imai et al. ................... 707/201 |
| 6,078,322 A | 6/2000 | Simonoff et al. | |
| 6,173,316 B1 | 1/2001 | De Boor et al. | |
| 6,317,781 B1 | 11/2001 | De Boor et al. | |
| 6,341,316 B1 | 1/2002 | Kloba et al. ................. 709/248 |
| 6,779,178 B1 * | 8/2004 | Lloyd et al. ................. 717/174 |
| 2001/0056497 A1 | 12/2001 | Cai et al. | |
| 2002/0002568 A1* | 1/2002 | Judson ....................... 707/513 |
| 2002/0174010 A1* | 11/2002 | Rice, III ....................... 705/14 |
| 2003/0088580 A1* | 5/2003 | Desai et al. ............. 707/104.1 |
| 2003/0140315 A1* | 7/2003 | Blumberg et al. .......... 715/527 |
| 2006/0206890 A1* | 9/2006 | Shenfield et al. ........... 717/174 |

OTHER PUBLICATIONS

Jargon Software Inc.; End User Software License Agreement, Feb. 8, 2000. (redacted).

* cited by examiner

*Primary Examiner*—Meng-Al T. An
*Assistant Examiner*—Mark P. Francis
(74) *Attorney, Agent, or Firm*—Kinney & Lange, PA

(57) ABSTRACT

A system for deploying applications over a distributed network to web-enabled devices uses a server, with stored text files containing application logic, and an application assembler. The application assembler downloads and installs on each web-enabled device. Then, the application assembler downloads one or more text files from the server, retrieves program logic from each of the downloaded text files, and assembles the retrieved program logic into a fuctioning application. In some instances, a plugin that is downloaded and installed on each web-enabled device is activated by web pages on the server to launch the application assembler.

19 Claims, 11 Drawing Sheets

SYSTEM AND METHOD FOR DEPLOYING AND IMPLEMENTING SOFTWARE APPLICATIONS OVER A DISTRIBUTED NETWORK

CROSS-REFERENCE TO RELATED APPLICATIONS

This application claims priority from Provisional Application Ser. No. 60/270,031, which was filed on Feb. 20, 2001, entitled "SYSTEM AND METHOD FOR DELIVERING DISTRIBUTED APPLICATIONS OVER THE INTERNET."

FIELD OF THE INVENTION

The present invention is generally related to the deployment and implementation of software applications, and more particularly, to the deployment and operation of compact, graphical, thin-client, Internet-enabled, software applications over TCP/IP networks, including use with slow Internet connections and in Application Software Provider environments.

BACKGROUND OF THE INVENTION

The growth of the Internet, coupled with the expansion of nearly every element of existing technologies and industries onto the Internet, has fueled a desire to increase both the power and the speed of Internet services. Seemingly at cross purposes with the desire for improved speed, companies and Internet users seek improved functionality as well. As software applications have become increasingly powerful, attempts to port the power and functionality of traditional software applications to remote users over wide area networks (WANs), such as the Internet, placed undesirable processing burdens on Internet servers and increased overall network traffic, resulting in declines in both performance and speed.

Current technologies for writing and deploying software applications to remote users across WANs are best suited for business-to-consumer (B2C) applications such as those offered by online book stores, auction sites, and the like, such as Amazon.com and Ebay. Typically, these types of applications require a number of interactions with the host in order to accomplish even a small transaction, such as adding a book to a virtual shopping cart, and so on. This business-to-consumer paradigm typically does not offer the functionality required for business-to-business or business-to-employee applications, which often require a greater amount of processing power than a business-to-consumer distributed application.

In addition to increased server traffic and declines in application performance, attempts to introduce greater levels of functionality to distributed applications, namely software applications that are deployed to remote users, typically introduce additional disadvantages. For example, such applications typically have large application program sizes, requiring a great deal of download time and often including complicated, time consuming, and costly installation procedures. Additionally, such applications often require expensive and resource-intensive software on network servers, and typically prove difficult to update with new features or bug fixes.

For devices that communicate over a wireless network, such as wireless personal digital assistants (WPDAs), where available bandwidth is many times less than that used with desktop computers, the disadvantages of prior art applications are amplified. Generally, the term "WPDA" refers to a small portable handheld computer device with a processor, Random Access memory, long-term storage, a display screen, and an input mechanism (such as buttons, a virtual or physically attached keyboard, or a touch screen used with a special stylus). Additionally, the WPDA also includes a wireless modem for connection to the Internet. WPDA products as described herein include the Palm VIIx, the Kyocera 6035, the Handspring Visor, the Compaq iPaq, the Sony Clio, and the like. Most WPDAs sold in the United States, as of the date of this writing, use either the Palm OS or Windows CE operating system, though other operating systems are anticipated in the future.

Typically, wireless devices have much less dynamic memory and storage available than desktop computers. Additionally, the wireless signal is more susceptible to service interruptions than traditional land lines, introducing a greater probability of delays each time the remote server is accessed, such that server-intensive applications may not work as well in the wireless environment. Moreover, the mobility of the wireless device user also creates deployment challenges, which may be exacerbated further when updates and bug fixes must be installed.

Existing approaches for providing WPDA solutions generally can be grouped into two general categories: browser-based solutions and locally installed solutions. Existing WPDA solutions typically fall within one or the other category or within some hybrid of one of the categories.

Browser-based solutions operate much like a web browser on a Windows PC, using a subset of HTML or a similar markup language. These solutions require a connection to the wireless network at all times. The application cannot be used off-line. If the connection is interrupted during use, all work maybe lost. Usability can also be quite low because an entire web page must be completely downloaded over typically a slow, wireless connection before the user can interact with it, and each interaction typically requests another web page to be downloaded. Finally, within such browser-based solutions, the ability to provide local programming instructions is limited or nonexistent.

Locally installed solutions typically consist of compiled application programs that are installed on each WPDA device. These applications allow users to work off-line (when a wireless connection is not available), and then to synchronize the data on the WDPA with the remote server at some later time, either when a wireless connection is available or by "hot-synching" the data with a PC that has a wired network connection. Typically, a separate set of programs must be developed for each WPDA operating system or platform on which the application is to be used. Deployment and support costs are increased because the programs must be installed on each user's WPDA, and must be updated with each new version of the program (to correct errors or to add new features). Additionally, the commonly used method of "hot-synching" the data with a PC requires the installation of special software on such PC, thereby adding another layer of complexity to the deployed application, which is another possible point of failure, as well as also increasing overall deployment and support costs.

The rapidly growing use of the Internet for personal and commercial purposes has highlighted a need for thin-client, graphical, software applications that can be used effectively over the Internet, regardless of the connection speeds, with both wired and wireless clients, in Application Software Provider (ASP) environments, and with little or no support required from software support personnel. Additionally, there is a need for a graphical, thin-client, software application that can provide a level of visual appearance and functionality (known as "look and feel") that previously could be found only in traditional client/server software applications that are designed to operate on internal high-speed networks.

BRIEF SUMMARY OF THE INVENTION

A system for deploying applications over a distributed network to web-enabled devices includes a server, which has stored text files with embedded application logic, and an assembler program. The assembler program downloads and installs on each web-enabled device. Once installed, the assembler program downloads one or more text files from the server, retrieves program logic from each of the downloaded files, and assembles the retrieved program logic into a functioning, graphical application in temporary memory. The assembler program is capable of building multiple applications according to the different program logic stored in the files on the server. In some embodiments, a plugin is also downloaded and installed on the web-enabled device so that web pages on the server then activate the plugin to launch the assembler program.

In the following FIGS. and the Specification, the trademarks XML, Netscape, Netscape Navigator, and Internet Explorer are used. XML is a registered trademark on behalf of the Worldwide Web Consortium. Netscape and Netscape Navigator are registered trademarks of Netscape Communications Corporation. Internet Explorer is a registered trademark of Microsoft. In the following FIGS., the acronym AVM refers to "Application Virtual Machine", and is not intended to represent a registered trademark of another party.

Figure 1:
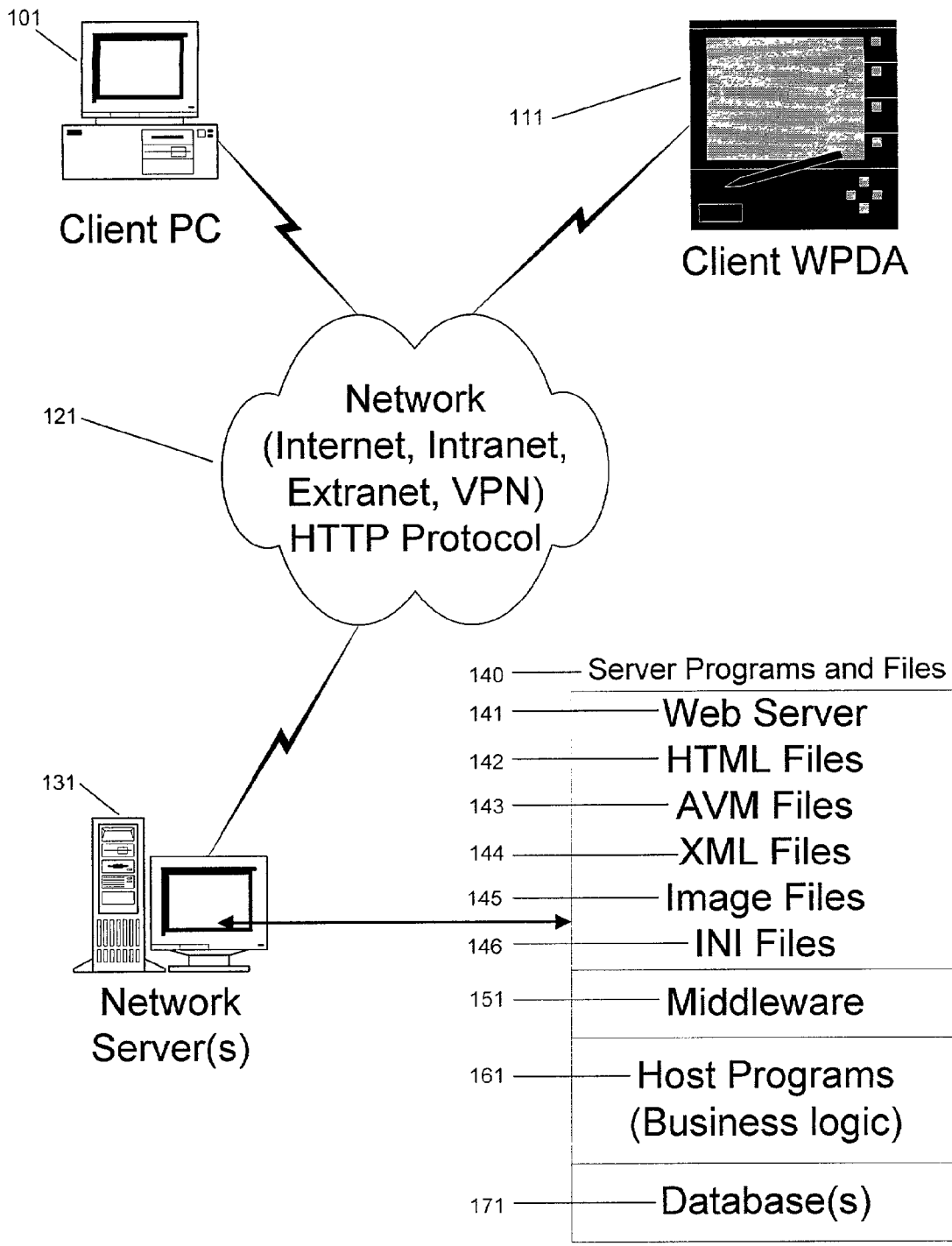
FIG. 1 is a block diagram of a typical arrangement of the major hardware and software elements used when deploying and operating a software application with the present invention.

While the above-identified illustrations set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

A software solution of the present invention includes an Application Virtual Machine (AVM) that is deployed by a server over a network to client devices, which are typically remote from the server. The AVM is installed with a starter plugin and run locally on the client computer. The AVM then accesses server resources, such as XML files, data, and the like, on the server over the network.

For the purpose of this discussion, the term "network" generally refers to any type of data communication network, whether wired or wireless. In the preferred embodiment, the term "network" includes the Internet. The Internet is a commonly used abbreviation for "Internetwork" and is used to refer to the collection of networks and gateways that utilize the Transmission Control Protocol/Internet Protocol (TCP/IP) suite of protocols, which are well-known in the art.

The term "client" refers to a computing device (such as a personal computer, a workstation, or a hand-held device), whether wired or wireless, connected to a network, such as the Internet, and that accesses shared network resources provided by another computer, such as a server. "Server" generally refers to a remote computer system that receives requests from client devices, and that returns responses to such client devices over the network. Finally, "computing device" may be a personal computer or workstation that uses any operating system or platform, such as a Windows PC, a Mac, a Sun Sparc, and the like. The term "Windows PC", for example, refers to a personal computer that uses one of several versions of operating systems that, as of the date of this writing, include Windows 95, Windows 98, Windows ME, Windows NT 4.0, Windows 2000, and Windows XP (all of which are trademarked products of Microsoft Corporation). Similarly, the Mac and Sun computers use proprietary operating systems onto which the AVM will be ported. For the purpose of this discussion, the phrase "client device" includes all Internet capable computing devices, regardless of operating system.

Generally, the AVM provides a method for deploying and executing Extensible Markup Language (XML) applications to a remote client computer, personal digital assistant or web-enabled device (whether connected to the Internet via a wired connection or via a wireless connection). The term "XML" (EXtensible Markup Language) refers to a markup language that is more flexible than the HTML markup language. While HTML uses only predefined tags to describe elements within the page, XML allows tags to be defined by the developer of the page. The definition of these tags can optionally be provided in a Document Type Definition (DTD). XML is formally defined by the World Wide Web Consortium (W3C), and is an SGML document type.

Generally, the term "element" refers to the basic logical unit in the structure of an XML document. Elements in a document are organized as a tree, with the document element as the root node. XML uses start/end tags or empty-element tags to specify the structure of elements within a document. An element may have an associated set of attribute values.

In a preferred embodiment, the AVM automatically downloads when the user navigates to a certain web page using a web browser, and the AVM installs itself on the client computer. The AVM contains definitions of component objects, including object types, object-specific attributes, events, and operations the component objects are capable of performing. The AVM interprets XML and other code downloaded from a web server on the network computer to render a full-featured application on the client computer with a native look and feel for the client operating system platform on which it is installed. The term "native look and feel" refers to a standard for the visual representation and user interface behavior of a set of GUI components, for use on a specific platform (model or family of computer devices), in order to afford the user the same appearance and operating characteristics as other software developed for that platform. The term "GUI" (Graphical User Interface) refers to a manner of displaying and allowing user interaction with a variety of visual objects of various shapes and sizes on a computer display device, such as buttons, menu bars, trees, list boxes, combo (pull-down) boxes, and tab panels, and the like. GUI objects are defined on a pixel by pixel level, unlike older character user interfaces, which only allowed a fixed number of rows and columns of text characters in a single non-proportional font.

In some instances, such as in many wireless devices and in legacy web browsers, automatic download and installation of the AVM and the starter plugin are not possible, in part, because the download and install functions are not supported by the particular platform. In such instances, the AVM for the particular browser/operating system platform may be downloaded manually and installed to practice the invention. In the preferred embodiment, the operating system of the local user's device and the web browser of the local user support automatic download and installation of the AVM.

The AVM offers several significant advantages as compared to HTML technology or compiled application technology (Java, C++, Visual Basic, etc.), all leading to greater user productivity, a more enjoyable experience for the application user, and reduced time and effort for technology professionals who develop, deploy and support applications. Specifically, the AVM downloads quickly, installs in seconds, and provides a graphical user interface (GUI) that looks and feels like standard applications on the client computer. Thus, technology professionals can deploy the AVM with a minimum of overhead and with almost no additional user training. Moreover, as will become apparent in the following discussion, costs and deployment issues relating to application upgrades and bug fixes are minimized by the AVM implementation. The AVM implementation minimizes cost and deployment issues, in part, because component elements of the deployed application reside on the server, thereby allowing upgrades for the various components without requiring a complete reinstallation of the application.

In a preferred embodiment, the AVM offers a larger set of user interface (UI) components as compared to HTML. HTML technology offers a very limited set of UI components, each with a very limited set of features. The highly functional UI components of the AVM allow the user to accomplish tasks in a reduced number of operations. The AVM builds the user interface locally on the client device, reducing the load time as compared with web servers serving HTML pages. The AVM has superior local processing capabilities reducing the dependency on remote hosts to execute application program logic. This leads to another productivity increase as the AVM greatly minimizes a condition known as "submit latency", which is defined as long, unacceptable delays between operations initiated by the user during the natural course of application usage.

The AVM also offers advantages over compiled applications. The AVM is capable of assembling and executing a robust application, but the AVM itself has a small footprint or size. Typically, the AVM is compressed into a known compression format, such as CAB or JAR, for download purposes. The compressed AVM is approximately 200 KiloBytes (KB) in size. Once the AVM downloads, it decompresses to a size of approximately 400 KB, which is still quite compact as compared with other similarly robust, compiled applications. The compact size of the AVM and its self-installing features allow its one-time download and installation to be performed in seconds, even over slow Internet connections. The AVM, as previously mentioned, then assembles a full-featured application on the fly, as needed.

Compiled applications (having features similar to the AVM assembled full-featured application) are typically much less compact than the AVM, require minutes and perhaps hours over slow connections and require the user, or an experienced technician, to perform the installation as a separate operation. A similarly featured, compiled application typically has a much larger download size (on the order of MegaBytes), and may extract to more than twice its download size. Furthermore, the similarly featured compiled application performs only one set of application functions, and a different download would be required to perform a different set of functions. For example, a downloaded word processing application allows the user to perform word processing functions, but a different download is required for the user to access database records, and so on.

By comparison, where possible the AVM is automatically downloaded in seconds, self-installs, and is immediately available to the user. Subsequently, multiple applications having different functionalities can be assembled by the AVM and used by the user without requiring additional software downloads. As previously mentioned, the AVM is downloaded as a self-extracting, compressed file of about 200 KB in size, and extracts to approximately 400 KB in size, which is less than a typical compiled application's download size. The AVM is specifically designed and constructed to be as small as possible in order to minimize the download time for deployment.

The AVM also offers a superior distributed application environment, because the application specific logic is assembled by the AVM from files on the server. The AVM does not contain application specific logic and does not require any of the application specific logic to be installed on the client device. The phrase "application specific program logic" refers to program logic ordinarily contained in a full-featured application, such as the application assembled by the AVM. However, the AVM may be platform specific, so that the assembled application works in particular operating environment. By assembling the application specific logic on the fly, the AVM allows the application developer to deploy application logic to only a single location rather than distribute it to each and every client installation. The user also benefits from this distributed environment since the application remains current with the developer's version, without requiring the user to perform any additional installation procedures. Initial and ongoing deployment and support costs can thus be substantially less than those typically found with compiled application implementations.

Finally, as compared with applications run entirely on the server side, the AVM presents a much smaller load on the server processor. It is possible to download a larger client application to the local user, which then works entirely off the web server. However, such a solution causes greater network usage and may limit the number of clients the server can support at any given time. The AVM, having a download size of approximately 200 KB, is downloaded quickly even over slow Internet connections, installed, and run on the client computer. The AVM uses the XML files on the server to assemble an application in temporary memory on the client computer. The AVM can process and perform sophisticated operations directly on the client computer, without requiring server interactions responsive to every action by the user. Thus, the AVM only accesses the server as needed in response to user interaction with the assembled application.

Generally, the AVM provides an accelerated user interface between a client device and the back-end database technology. Specifically, the AVM interprets XML from the web server, dynamically builds the user interface locally on the user's device, and processes the data locally on the user's device. Each user interaction with the local user interface does not require communication with the web server. The AVM can display and/or hide screens and generate new windows according to the user's interaction, accessing the web server only when required by the application logic. For instance, in the case of a long web-form with multiple logic branches, the AVM can draw windows and provide the questions for user input, and only contact the server once the form is complete. Thus, web server processing is minimized, reducing both network traffic and submit latencies. Additionally, the overall speed is enhanced because most of the processing is performed locally by the AVM, typically at a faster rate than communications with a remote server would allow. Finally, the entire interaction between the web server and the end user remains seamless in that the distinction between local AVM processing and web server processing is transparent to the end user.

In a preferred embodiment, the invention is implemented primarily in the C or C++ programming languages using object-oriented programming techniques. C and C++ are compiled languages—thus, C and C++ programs are written in a human-readable script which is translated by another program, called a compiler, which generates a machine-readable numeric code that can be loaded into, and directly executed by, a computer. The C and C++ languages are well-known and many articles and texts are available which describe the languages in detail. Accordingly, for reasons of clarity, the details of the C and C++ languages and the operation of the C and C++ compiler will not be discussed further in detail herein.

Object-Oriented Programming (OOP) techniques involve the definition, creation, use and destruction of "objects." These objects are software entities comprising data elements and routines, or functions, which manipulate the data elements. These techniques are also well-known and many articles and texts are available which describe them. Accordingly, the details of these techniques will not be discussed further herein.

The AVM utilizes a number of industry standards including COM, CAB, JAR, ZIP, HTML, XML and Authenticode technologies. These techniques are also well-known and many articles and texts are available which describe them. Accordingly, the details of these standards will not be discussed further herein.

Finally, the invention, referred to as the AVM, may be practiced on a range of digital computers running operating systems which the AVM has been designed to support and for which a specific embodiment of the AVM has been created. Usage of the invention is enhanced when installed on computers that have a connection (wired or wireless) to a TCP/IP network. The AVM executes platform neutral software applications coded in XML format according to a specific Application Schema definition. The term "platform-neutral" (also called "platform independent" and "hardware independent") refers to software that can be run on a variety of computers. The hardware-specific instructions are in some other program (operating system, DBMS, interpreter, etc.). For example, interpreted programs are machine independent, providing there are interpreters for more than one machine.

As shown in FIG. 1, in preferred embodiments of the invention, the AVM is used on a Client PC 101 and/or on a Client WPDA 111. A Client PC 101 on which applications are deployed and implemented by the AVM requires only a standard Windows operating system, plus an Internet Explorer web browser and/or a Netscape web browser. No other special software needs to be installed on a Client PC 101 to use the AVM for deploying and implementing a software application. A Client WPDA 111 on which applications are deployed and implemented by the AVM requires only a standard PalmOS, Windows CE, or comparable operating system. No other special software needs to be installed on a Client WPDA 111 to be able to use the AVM for deploying and implementing a software application.

The Client PC 101 and Client WPDA 111 (collectively referred to as "client devices") communicate with Network Server(s) 131 by means of a Network 121, which implements the HTTP protocol. The Network 121 may be the Internet, an Intranet (internal network), an Extranet or a VPN (Virtual Private Network). The Network Server(s) 131 consist of one or more computers connected to the Network 121. The network server(s) 131 contain software programs and data files, such as a web server 141, HTML files 142, AVM files 143, XML files 144, Image files 145, INI Files 146 and a Middleware software product 151. Any or all of these files may be distributed on other computers in network communication with the web server, though in the preferred embodiment, at least the HTML files, AVM files, image files and XML files are stored on the web server.

Generally, the Web Server 141 implements industry-standard World Wide Web protocols, such as the "Hypertext Transfer Protocol" (HTTP) as defined in RFC 2068 of the W3C web consortium, and the like. HTML Files 142, which contain Hypertext Markup Language (HTML) code, include information for deploying the AVM Files 143 to client devices, as well as startup instructions and parameters for the AVM. Generally, the AVM Files 143 are deployed by the web server to client devices based on the information in the HTML Files 142. Additionally, the HTML files 142 contain parameters for the AVM to access the XML Files 144 and Image Files 145, which constitute the software application to be deployed and implemented by the AVM. Finally, the Middleware 151 software product handles communications between the software application deployed on client devices and Host Programs 161, which commonly implement most of the "business logic" in a software application and which also handle all database interactions. Database(s) 171 are a commonly used means for the storage and retrieval of information used by the Host Programs 161; however, other means may also be used to store such data.

Figure 2:
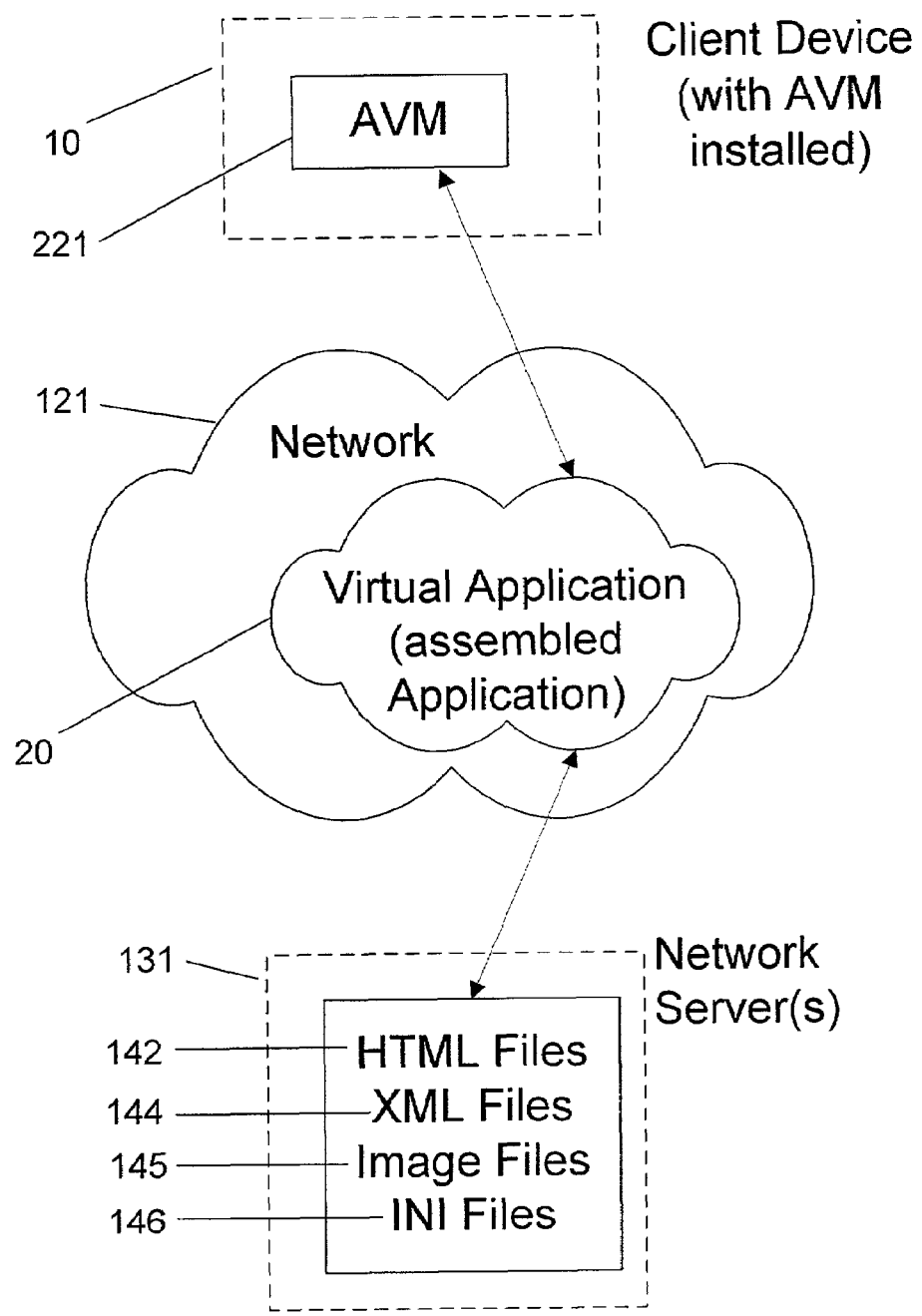
FIG. 2 is a conceptual block diagram illustrating the operation of the present invention as a distributed network application that assembles a Virtual Application from component software modules stored on one or more computers on a network.

As shown in FIG. 2, conceptually the AVM is used to execute "Virtual Applications" that are assembled from files and programs residing on one or more computers on a network. Only AVM 221 is installed on a Client Device 10. Other files residing on Network Server(s) 131 are downloaded over a Network 121 to assemble the complete Virtual Application 20 that is then executed by the AVM 221 on the Client Device 10. The HTML Files 142 or the INI Files 146 provide various control parameters to the AVM 221 such as the Uniform Resource Locators (URLs) that specify the location of the XML Files 144 and Image Files 145. The term "URL" refers to the addressing scheme used on the World Wide Web. A URL consists of several parts, which specify the protocol (i.e. file transfer protocol, hypertext transfer protocol, and the like), domain name or IP address, port number, path and resource details needed to access a particular resource from a particular computer system. The XML Files 144 and Image Files 145 specify the appearance and behavior of the assembled Virtual Application 20 during execution by the AVM 221 and in response to user interactions during such execution.

Figure 3:
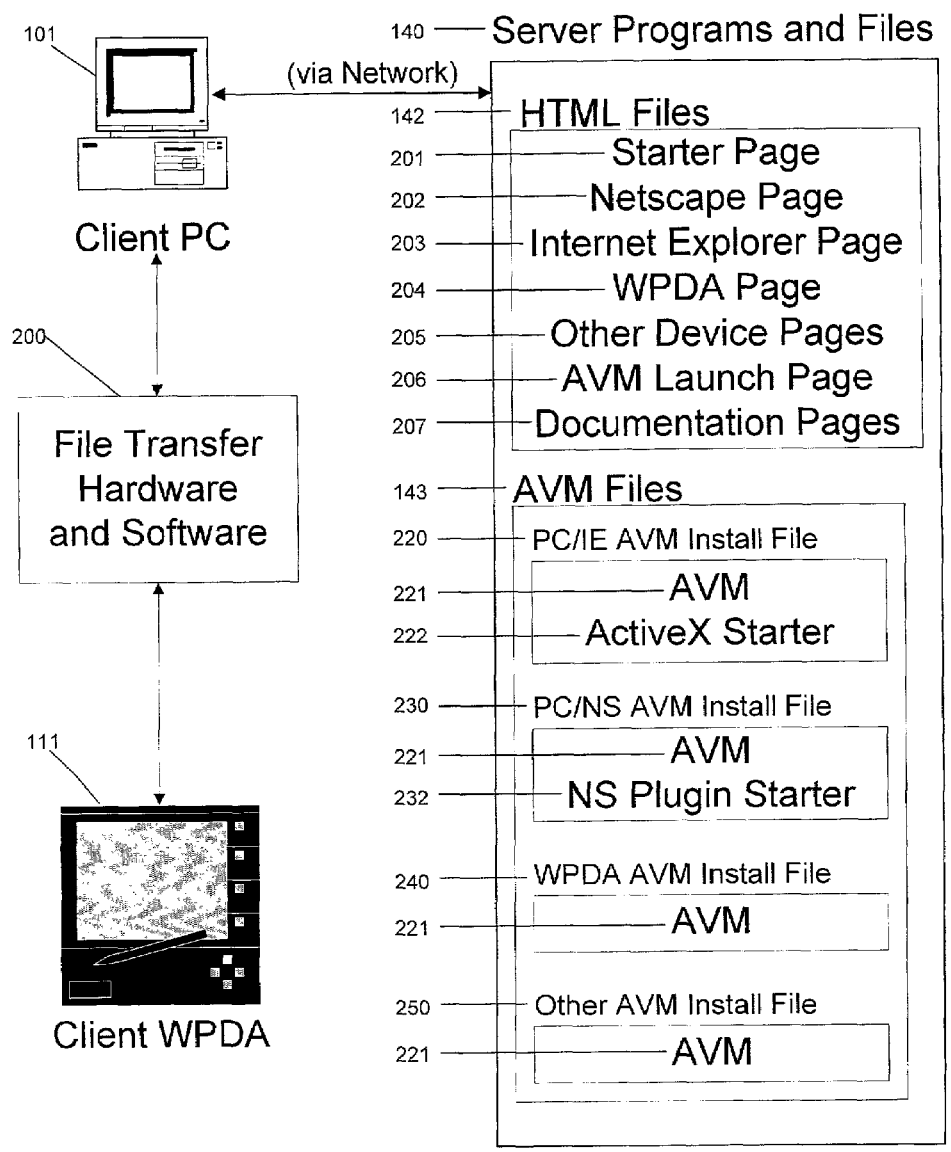
FIG. 3 is a block diagram of the major software elements and data structures used when deploying the present invention, including exploded views of the HTML Files 142 and AVM Files 143 from FIG. 1.

Referring now to FIG. 3 in preferred embodiments of the invention, the HTML Files 142 cause the automatic deployment of the appropriate platform-specific AVM Files 143 to the client device. As previously indicated, automatic download and installation capabilities normally exist on a Client PC 101 with a newer operating system, such as Windows 98, 2000 or NT; however, the capabilities do not always exist in legacy browsers or on wireless devices, such as a Client WPDA 111. Where automatic download and installation capabilities do not exist, alternate means of deploying the AVM are required.

The executable object code for each platform, which is supported by an embodiment of the AVM, is packaged into a set of files in industry-standard "CAB" and "JAR" file formats. These standard formats provide automatically downloadable support for the commonly used Internet Explorer and Netscape Navigator web browsers on a Client PC 101. Additionally, the AVM is also packaged into a set of files in the industry-standard "ZIP" file format to provide downloadable support for older versions of Netscape, which do not necessarily provide auto-install functionality, and to provide support for various Client WPDA 111 devices.

In the present invention, regardless of the operating system or browser, the AVM system works essentially the same way, by downloading and installing a compiled executable, which does not contain application specific program logic, and a starter module. The executable may be particular to the client's operating system, and the starter module is typically a plugin that is particular to the client's browser. For example, for deployment to users of the Internet Explorer web browser, a PC/IE AVM Install File 220 containing the executable object code for the AVM 221 and the ActiveX Starter 222 is compressed into Microsoft CAB file format and digitally signed by a Verisign certificate to authenticate its origin. For deployment to users of the Netscape Navigator web browser, one version of the PC/NS AVM Install File 230 containing the executable object code for the AVM 221 and the NS Plugin Starter 232 is compressed into Sun JAR file format and digitally signed by a Verisign certificate to authenticate its origin, and a second version is compressed into standard ZIP file format. For deployment to users of the Client WPDA 111, a WPDA AVM Install File 240 prepared in "ZIP" format contains the executable object code for the AVM 221, which may itself contain its own starter module. Similarly, additional embodiments of the AVM for other existing or future client devices may be packaged into an alternative AVM Install File 250 prepared in a compressed file format compatible with such device and containing the executable object code for the AVM 221 and possibly a starter plugin module where such capabilities exist on such other client device.

In practice, the above-described elements operate essentially as follows when used on a Windows PC. For a Client PC 101 that has a Netscape Navigator or Internet Explorer web browser of Version 4 or higher, a user navigates using either browser to the Starter Page 201. As the client's browser loads the Starter Page 201 (which may be the home page for the particular application) into the browser window, the browser application evaluates and executes JavaScript code (or other embedded ECMA scripts) embedded in the Starter Page 201. This embedded code detects the brand and version of web browser on the client computer in which it is running, and tests to see if the appropriate version of the AVM 221 and its associated starter plugin 222 or 232 is already installed on the Client PC 101.

The term "ECMAScript" refers to a standard Internet scripting language formally known as ECMA-262 (ECMAScript), sanctioned by the European Computer Manufacturers Association (ECMA). The language specification was based on an early version of the JavaScript scripting language from Netscape Corporation. This specification was then used by Microsoft, Netscape, Opera, and other browser venders who have provided support for it in later versions of the JavaScript and JScript scripting languages.

As previously indicated, the AVM 221 does not contain application specific code; however, at times, it may be necessary to update the AVM with a newer version. Since it is usually optimal for every user to work with the same versions of software and for all users to receive upgrades as soon as possible, the embedded code in the Starter Page 201 requires the client device to use the newest version of the AVM 221. Within this testing procedure, the embedded code tests to make sure that the most current versions of the AVM 221 and the starter plugin 222 or 232 are installed. If the required version is not already installed, the embedded code redirects the browser to either the Netscape Page 202 or the Internet Explorer Page 203 (depending on the browser) to download and install automatically the appropriate set of AVM Files 143 from the Network Server(s) 131. During the testing process (which ordinarily takes less than a second), if the embedded code detects an older version of Netscape, which lacks the auto-install capability, the embedded code redirects the browser to one of the Documentation Pages 207, which instructs and provides a link for the user to download and manually install a "ZIP" version of the PC/NS AVM Install File 230. If the embedded code determines that an unsupported brand or version of web browser is being used, the embedded code redirects the browser to one of the Documentation Pages 207, which informs the user that a web browser upgrade is required in order to be able to install the AVM.

Upon completion of the download and installation of the AVM Files 143, or if the code in the Starter Page 201 determines that the correct version of the AVM is already installed, the embedded code redirects the browser to the AVM Launch Page 206. The AVM Launch Page 206 contains "Object" and "Embed" HTML tags that implement the automatic initiation of a session of the AVM by referencing the ActiveX Starter 222 or NS Plugin Starter 232 (depending on the browser) that is installed on the Client PC 101. These HTML tags also contain sets of name/value pairs that specify the assignment of values needed for various initial startup parameters used by the AVM. The starter plugin automatically launches or starts the AVM.

The AVM initializes its internal memory structures and components, downloads one of the XML Files 144 as specified in the AVM Launch Page 206 from the Network Server(s) 131, and builds a Document tree based on the downloaded file using an XML parser contained within the AVM. Next, the AVM runs an initial program function that typically makes a graphical user interface (GUI) frame (or window) visible on the PC screen, and then waits for the user to interact with the GUI frame. The user can then interact with the GUI frame by entering data, clicking a button, moving a scroll bar, selecting a choice from a list, or similar actions that are common in PC Windows applications or even on HTML pages on the Internet.

Generally, the operating system of the WPDA 111 and its browser application are different from typical computer operating systems and their associated browser applications. When used on a Client WPDA 111, as of the date of this writing, WPDA 111 software and operating environments do not support automatic download and installation of the AVM and starter modules. Instead, the AVM is deployed in the following manner. The user first uses a web browser on a Client PC 101 to navigate to the WPDA Page 204. This web page contains instructions and a link to download the appropriate WPDA AVM Install File 240, in "ZIP" compressed format, for the type of Client WPDA 111 on which the AVM is to be installed. The user then extracts the contents of the downloaded zip file using any commercially available zip utility (such as WinZip, PKZip, and the like). Finally, using the device-specific, standard File Transfer Hardware and Software 200 provided with the Client WPDA 111 by its manufacturer, the user copies the unzipped AVM 221 files from the Client PC 101 to the Client WPDA 111. This type of download and installation is often performed by placing the WPDA in a hardware "cradle" attached to a port of the PC and running a utility program on the PC to "sync" (transfer) selected files from the PC to the WPDA.

Upon completion of the download and installation of the appropriate AVM Install File 240 on the Client WPDA 111, an icon or menu selection for the AVM appears on the Client WPDA application menu and/or desktop window. The user chooses this icon or menu option, and the WPDA operating system starts the AVM. The AVM initializes its internal memory structures and components and then displays an application selection form to the user. The user may select a previously run application from a list, or may request a new application by entering the URL of one of the INI Files 146 and clicking a "Load" button. The AVM downloads the specified INI file from the Network Server(s) 131, and the AVM then parses the INI file contents to obtain sets of name/value pairs that specify the assignment of values needed for various initial startup parameters used by the AVM.

The AVM then downloads one of the XML Files 144 from the Network Server(s) 131 as specified in the selected INI file, and builds a Document tree based on the downloaded file using an XML parser contained within the AVM. The AVM then runs an initial program function that typically makes a GUI frame (window) visible on the WPDA screen, and waits for the user to interact with the GUI frame by entering data, clicking a button, or similar actions.

The modular initiation, instantiation and operation of the present invention on a Client PC 101, as well as on a client WPDA, provides a number of advantages over traditionally installed software and over typical thin-client implementations. Specifically, the AVM module has a small footprint, typically less than 200 KB in download size and less than 400 KB after installation. The AVM is downloaded by visiting a web page and is essentially run locally on the user's computer. The small footprint requires minimal load time for the end user, and the AVM installs quickly. Thus, initialization of a client computer can be accomplished with little overhead demand on technical support staff or on the server itself and with few memory demands on the client-side.

The AVM dynamically constructs component elements as required based on user operations, and queries the database and web server as needed. For the most part, only data values are passed between the client and the server, minimizing transmission time and costs. Moreover, the application essentially runs locally, taking advantage of local processing power to minimize server interactions to provide a fully functioning program, while reducing submit latencies. Since the AVM only queries the database and the web server as needed, network traffic is minimized, and the vast majority of the application processing is performed locally thereby accelerating the performance of the distributed application.

Additionally, the AVM downloads the XML Files 144 and Image Files 145 and assembles the component elements each time the user visits the site, so that additions and modifications can be introduced on the fly, without the need for support personnel to participate in the deployment process. Thus, the user of the client device can be assured of using the most recent version of the software each time the client signs on to the server. Moreover, the technique described herein is equally applicable to Intranets and internal networks. On any network, such use of the AVM can reduce upgrade and installation overhead enterprise wide.

Figure 4:
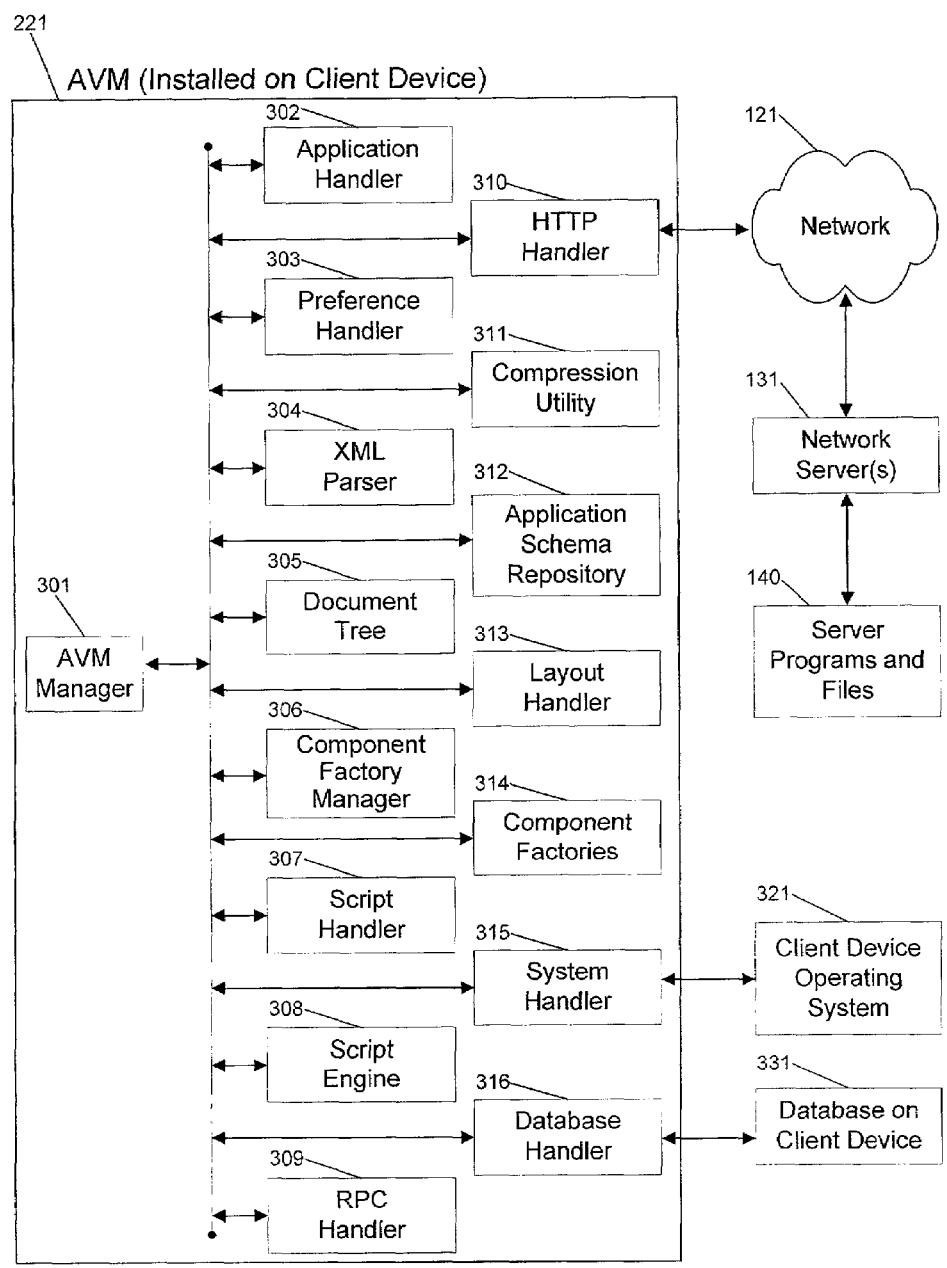
FIG. 4 is an exploded view of the AVM 221 from FIG. 3, depicting a block diagram of the major software components of the AVM 221 and their interfaces with external hardware and software components, as implemented when the AVM 221 is installed and operating on a client device.

Referring now to FIG. 4, when the user starts a session of the AVM, which is done in a manner in accordance with the platform on which it is installed as described above, the AVM first initializes its various software elements, such as an AVM Manager 301, an Application Handler 302, a Preference Handler 303, an XML Parser 304, a Document Tree 305, a Component Factory Manager 306, a Script Handler 307, a Script Engine 308, a Remote Procedure Call (RPC) Handler 309, an HTTP Handler 310, a Compression Utility 311, an Application Schema Repository 312, a Layout Handler 313, Component Factories 314, a System Handler 315, and a Database Handler 316. The AVM Manager 301 is a top-level component that maintains handles to all the other components and orchestrates their operations. In this discussion, the term "handle" refers to a temporary name or number assigned to a software object such as a GUI component or a function (set of programming instructions), as a way of identifying and providing access to that object. The Application Handler 302 maintains a list of instantiated applications, and has a GUI control for the user to load new applications and run cached applications.

The Preference Handler 303 maintains a persistent database of user preferences that tailors the AVM behavior to the particular needs of the individual user. The Preference Handler 303 has a GUI control that allows the user to update the preference database. Developers can use the Preference Handler 303 to define custom preference items that are unique to their applications. The XML Parser 304 interprets a stream of XML data and provides methods to retrieve specific information about the elements of the XML document and their properties. In this discussion, the term "method" normally refers to a named programming command that implements programming instructions applied to a target object in order to obtain information about the object or to change some characteristics of the object. A method is invoked (run) by specifying the object name, the method name, and any parameters required by the signature (interface definition) of the method.

The Document Tree 305 maintains a persistent database of elements from parsed documents arranged in a tree-style hierarchical order. The Document Tree 305 also contains methods for retrieving, updating, and deleting documents, elements of documents, or even attributes of an element contained within a document. The Document Tree 305 shares these methods with the Script Handler 307, as required and as discussed in greater detail below. The Component Factory Manager 306 acts as the interface between the AVM and each of the individual Component Factories 314. The Script Handler 307 provides a generic interface to a specific script engine and handles various high-level operations for initializing and invoking scripts. The Script Engine 308 is an ECMA-compliant script engine that has an interface to register scriptable components, parses script in ECMA format, and provides methods to invoke script functions. The RPC (Remote Procedure Call) Handler 309 formats HTTP requests that invoke server-side procedures, interprets the result set returned from the remote host, and invokes methods of local components as directed by the result set. The HTTP Handler 310 implements HTTP methods to communicate with remote hosts to receive application files, invoke remote procedures, and provide short-term and long-term storage for data received from network servers. The Compression Utility 311 translates a compressed file of data into its original uncompressed state. The Application Schema Repository 312 maintains a persistent database of components along with their properties and operations as defined in the application schema document. The Layout Handler 313 analyzes the positioning properties of a group of GUI components and translates them into component dimensions and coordinates for the display device of the platform that is running the AVM. The Component Factories 314 are a collection of handlers that render visual components and carry out operations specific to the components that they create. In the preferred embodiment of the AVM, every platform implementation of the AVM has each of the factories depicted in FIG. 6 in an exploded view of the Component Factories 314 and as further explained below.

The System Handler 315 provides a generic interface to platform specific operations that can be provided by the Client Device Operating System 321. The Database Handler 316 provides an interface to a Database on Client Device 331 that operates on the same device that is running the AVM.

The AVM implements a distributed network application that operates on the top three layers of the Open System Interconnection Reference Model (commonly known as the "OSI 7-Layer Model"). The HTTP Handler 310 operates primarily on the Session Layer (Layer 5), when managing interactions with the Network Server(s) 131. The RPC Handler 309 and Compression Utility 311 operate primarily on the Presentation Layer (Layer 6) when constructing, parsing and decompressing inbound and outbound messages and data streams. The other AVM components shown in FIG. 4 primarily operate on the Application Layer (Layer 7).

Figure 5:
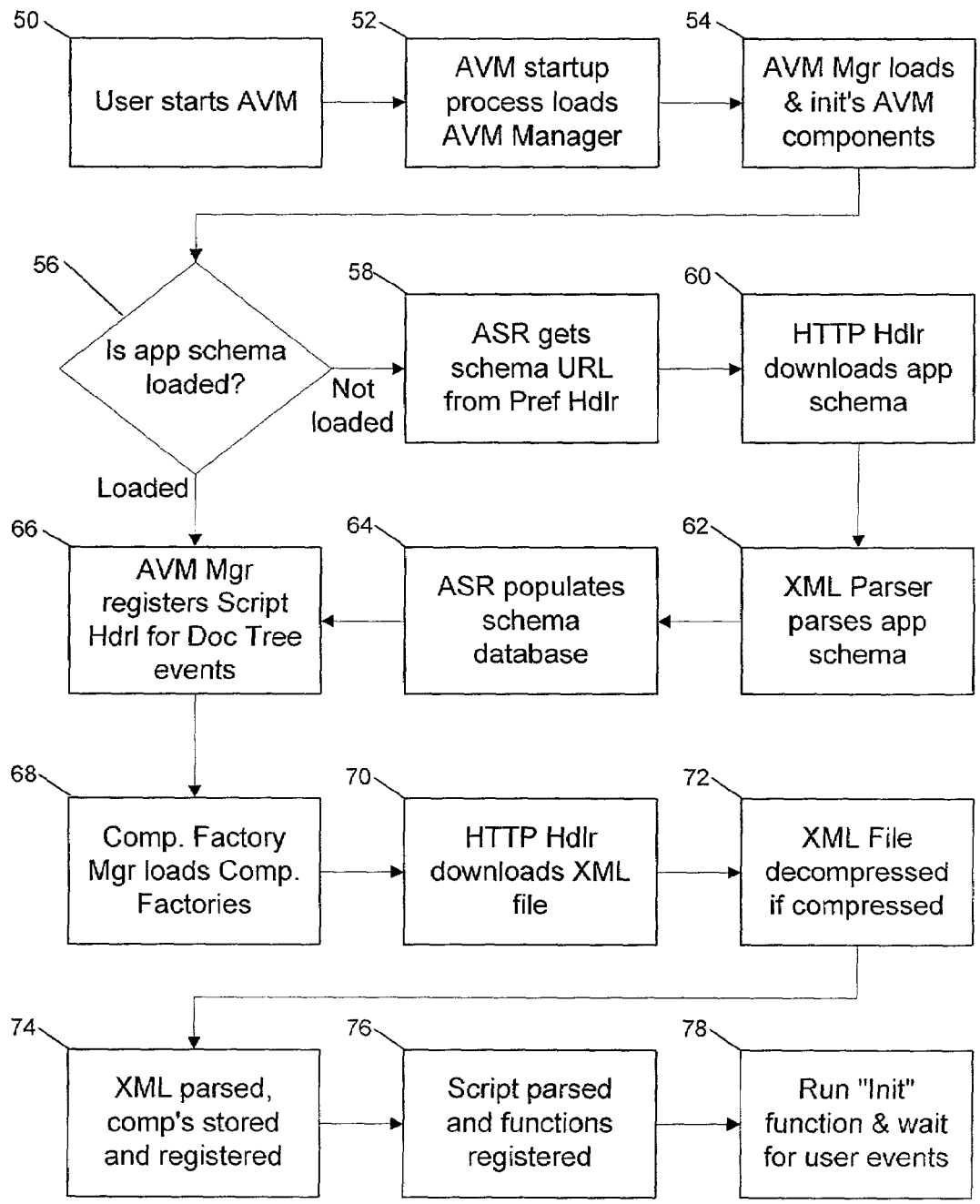
FIG. 5 is a flow diagram showing the steps in the process of instantiating the present invention on a Windows PC.
Figure 6:
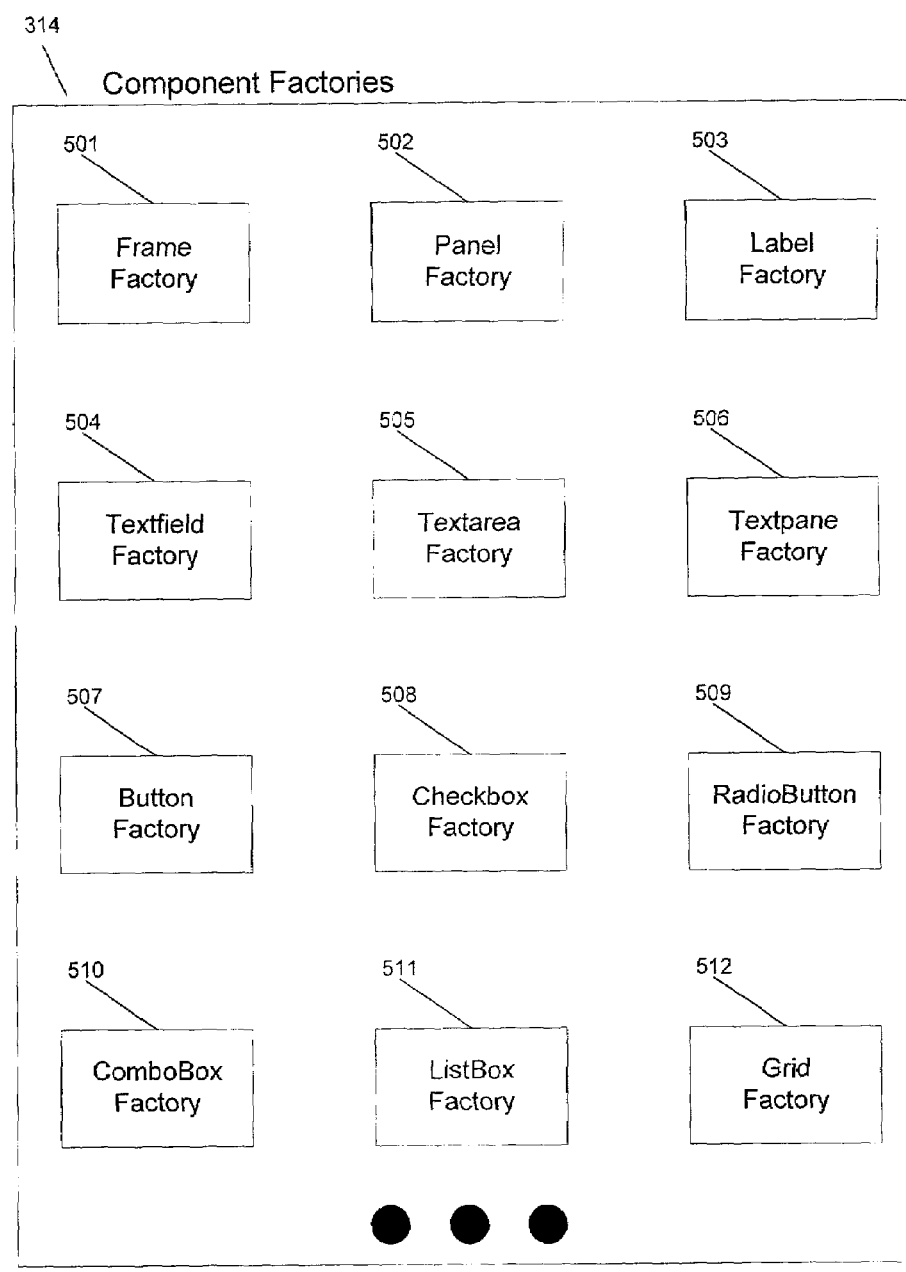
FIG. 6 is an exploded view of the Component Factories 314 from FIG. 4, depicting a block diagram of the individual component factories implemented within the Component Factories 314.
Figure 7:
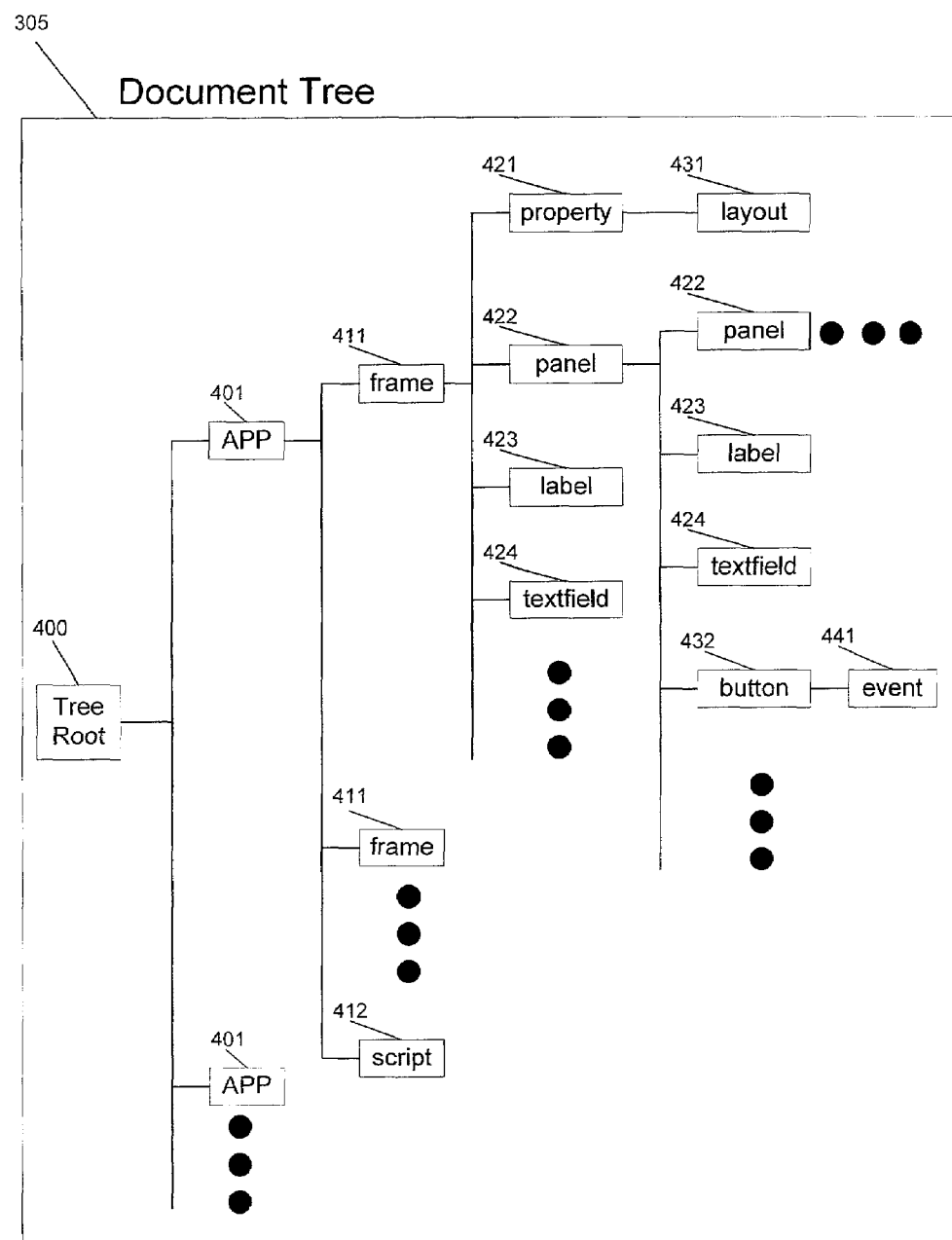
FIG. 7 is an exploded view of the Document Tree 305 from FIG. 4, depicting a tree structure block diagram of the manner in which visual components and program logic from XML Files 144 are stored during operation of the AVM 221.
Figure 8:
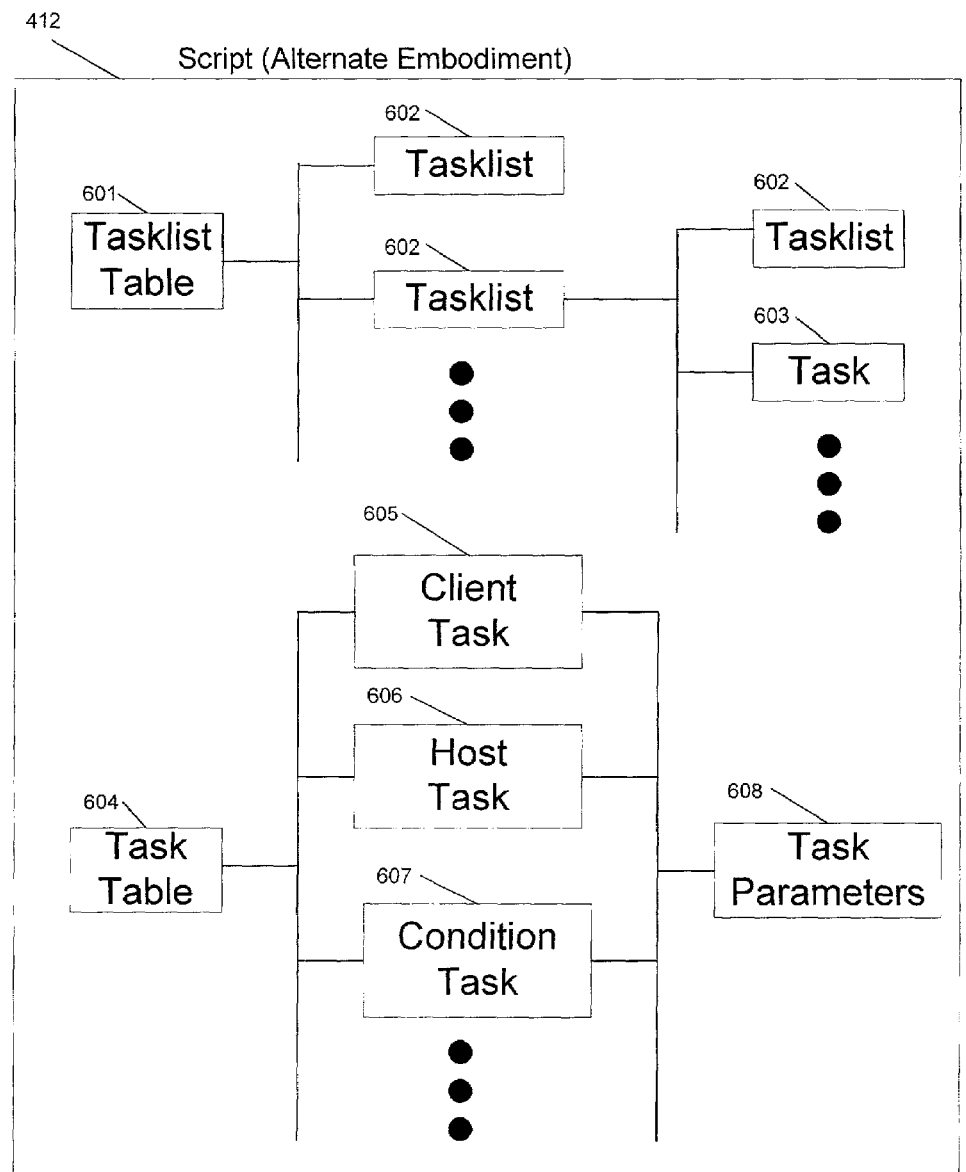
FIG. 8 is an exploded view of the Script 412 from FIG. 7, depicting a block diagram of an alternate embodiment of the Script 412 software component.

FIG. 5 illustrates a flow diagram of the application assembly process of the present invention. Generally, FIGS. 6-8 provide expanded views of elements contained in FIG. 5. To assist in following the discussion, when a reference is made to FIG. 5, the specific element or step will be identified as well, to place the reference in context.

As shown in FIG. 5 (including elements and reference numerals from FIG. 4), when the user starts the AVM (step 50), the AVM startup procedure begins with the loading of the AVM Manager (identified by reference numeral 301 in FIG. 4), which is the top-level component of the AVM (step 52). Generally, the AVM Manager initializes itself by obtaining a handle to all of the AVM components (302-316 shown in FIG. 4) as a result of invoking a constructor routine that loads each component into working memory (step 54). The AVM Manager uses these handles during the course of its normal operation to invoke the methods of each component when required.

During the instantiation of the Application Schema Repository (ASR) 312, a check is made to see if the schema database is currently loaded with application schema records (step 56). If the database is empty then the Application Schema Repository 312 queries the Preference Handler 303 for the location of the application schema document (a URL value) (step 58). The Application Schema Repository 312 uses the HTTP Handler 310 to download the application schema document from the Network Server(s) 131 according to the location retrieved from the Preference Handler 303, using the device-specific wired or wireless connection to the Network 121 (step 60). The Application Schema Repository 312 then uses the XML Parser 304 to parse the application schema document and obtain information about the schema elements (step 62). The Application Schema Repository 312 then stores this information in order to populate the schema database (step 64).

Once the schema database has been populated this routine will not be invoked again until the user changes the schema document URL in the preferences system. The schema database maintains information about each type of valid object that an application may contain. This information includes the names of the object types, properties of each object, default values of the properties, scriptable methods these objects expose, and names of handler components that carry out the operations of the scriptable methods.

During the instantiation of the Script Handler 307, the AVM Manager 301 passes a handle of the Document Tree 305, which is used by the Script Handler 307 (as discussed below). The AVM Manager 301 registers the Script Handler 307 as an "Event Listener" for any events that are triggered by user interaction with the AVM (step 66). The registration process is platform dependent.

The AVM Manager 301 passes handles of the initialized Application Schema Repository 312 and the Script Handler 307 to the Component Factory Manager 306. The Component Factory Manager 306 uses the handle to the Application Schema Repository 312 during its initialization to load all required Component Factories 314 that are detailed in the application schema (step 68). The handle to the Application Schema Repository 312 is maintained throughout its existence, and it is used to obtain property information whenever the Component Factory Manager 306 is called upon to render a particular object. The handle to the Script Handler 307 is used to register each component factory as a handler of script methods for the component type that each factory creates.

As shown in FIG. 6, the Component Factories (reference numeral 314 in FIG. 4 and referred to in step 68 in FIG. 5) are a collection of handlers that render (display) visual components and carry out operations specific to the components that they create. In the preferred embodiment of the AVM, the following individual component factories, at a minimum, will be found in every implementation of the AVM. The Frame Factory 501 renders a visible window that has a title at the top, a status message area at the bottom, and can contain several other visible components. The Panel Factory 502 renders a container that may have a border, titled or untitled, and may contain several other components. The Label Factory 503 renders a single line (or multiple lines on some platforms) of text that is usually used to identify the name or function of another component.

The Textfield Factory 504 renders a rectangular box that displays a single line of text. It may allow the user to add, delete, or modify the text in the box via input capabilities inherent to the platform upon which the AVM is running. The Textarea Factory 505 renders an object similar to the Textfield Factory 504 except it may have multiple lines of text. The Textpane Factory 506 renders an object similar to the Textarea Factory 505 but does not allow its text to be modified by the user. The Button Factory 507 renders a labeled rectangular object that triggers an event when pushed or clicked. The Checkbox Factory 508 renders a square box labeled with text to identify its purpose. It has a "checked" and "unchecked" state that the user controls by clicking in the square area. The Radiobutton Factory 509 renders a circular control that has a label and a checked and unchecked state. These controls are usually grouped together to create a list of choices where any one choice when selected will cause the others in the group to be deselected.

The Combobox Factory 510 renders a rectangular object with a button and a textfield containing a label that signifies a currently selected item from a list that it maintains. The list is rendered (drops down or pops up) when a down-arrow button next to the label is "clicked". The Listbox Factory 511 renders an object similar to the Combobox Factory 510, except it displays multiple lines of text and signifies the currently selected object by inverting the foreground/background text on the item that is selected. The Grid Factory 512 renders a tabular view of data in cells that are made up of labeled columns and rows. Vertical and horizontal scrollbars give the user the ability to "scroll" to data that lies beyond the visual border of the grid.

The above component factories define and expose (make available to the user) a number of methods (operations) that generally modify the state of the component as defined by the application schema. For example, the Textfield Factory 504 has a method named "SetText(string text)" that, when invoked with a valid text parameter, will change the text in the textfield to that of the parameter specified. Access to these methods is made available with the ECMA scripting engine, which makes the actual "call" to invoke the component method. Those components that contain data values normally also expose an interface that allows the RPC Handler (reference numeral 309 in FIG. 4) to invoke a component's exposed methods.

Referring again to FIG. 5 (specifically, step 54), once all AVM components are initialized, the AVM Manager (reference numeral 301 in FIG. 4) queries the Preference Handler 303 for the "initial application" property, which in the preferred embodiment of the invention has been provided by the contents of the HTML Files 142 during startup of the AVM 221.

If the initial application property record is not found in the preference database, then the AVM Manager 301 instructs the Application Handler 302 to render its application selection form. From the application selection form, the user may select an application that has been cached from a previous AVM session. Cached application data is stored in the Document Tree 305. To cache a new application, the user enters the URL of a startup document that is one of the INI Files 146 on the Network Server(s) 131, and presses a "Load" button. More generally, the user enters the URL of a different web page document, which serves as the startup document for a different application.

The Application Handler 302 uses the HTTP Handler 310 to download the startup document and the downloaded data is stored in a memory location managed by the HTTP Handler 310. The Application Handler 302 then analyzes the document, and extracts parameters (name-value pairs) that describe how to load and run the application. These parameters include the name of the application, the directory path where the application is stored on the Network Server(s) 131, and any user defined parameters. These parameters are then stored in the Document Tree 305 in the root node that is created for the new application.

When the Preference Handler 303 specifies the "initial application" or when the user selects an application to run from the application load form and presses a "Run" button, the Application Handler 302 tests the Document Tree 305 to determine whether there is a complete tree structure for the requested application (step 56 in FIG. 5). An attribute of the document's root node holds this information. If the tree structure is not complete (either because there has been no attempt to load it yet, or because a previous attempt failed), then the Application Handler 302 uses the HTTP Handler 310 to download the application document named in the properties of the root node (step 70 in FIG. 5). The location of the application in terms of a search path is also found as a property of the root node.

The document file is downloaded by the HTTP Handler 310 by preparing a URL string in the form "http://host.domain/path/appfilename.xml" and using established HTTP facilities specific to that platform (step 60 in FIG. 5). The document file is received as either plain text (XML format) or as binary data (compressed XML format using an industry standard compression algorithm such as ZLIB). The HTTP Handler 310 tests the downloaded data for the presence of a compression header that it recognizes. If it determines that the file is compressed, the HTTP Handler 310 uses the Compression Utility 311 to decompress the document (step 72). The HTTP Handler 310 reports to the Application Handler 302 when the download is complete, using an event loop structure unique to the platform on which the AVM is installed. Alternatively, as noted above, the AVM may be configured to bypass the application load form and immediately invoke a specified application.

The Application Handler 302 obtains a handle to the downloaded data (upon notification from the HTTP Handler 310) and passes it to the XML Parser 304 to interpret the document (step 74 in FIG. 5). During the interpretation process, the XML Parser 304 periodically updates the Document Tree 305 by adding tree nodes, representing each element in the documents, and by adding tree nodes for each attribute (property) of each element.

As shown in FIG. 7 (and referring to reference numerals introduced in FIG. 4), the Document Tree 305 contains one Tree Root 400 which is an entry point to the tree structure. The next level of the tree contains only Application (APP) elements 401, corresponding to the individual XML Files 144 that have been downloaded, parsed and stored in the Document Tree 305. There may be an arbitrarily large number of APP elements 401, limited primarily by physical constraints such as the amount of available memory in the client device. Each APP element 401 must have one or more frame elements 411 and one script element 412, in the preferred embodiment. Each frame 411 may contain various other elements such as a property 421, which further contains a layout element 431 that specifies the particular technique used to render the frame and its contents on the display screen of the client device. Frame 411 may also contain container objects (such as a panel 422), and non-container components (such as a label 423 and textfield 424), as well as other GUI components as defined in the Application Schema Repository 312 (in FIG. 4). In turn, a container object such as a panel 422 may also contain other panel containers, which may be nested arbitrarily deep. A panel 422 can also contain non-container components such as a label 423, textfield 424, and button 432. The button 432 contains an additional event element 441, which specifies a particular event that can be performed on the button 432. An example of a button event is a mouse "click". The button event may be characterized as a clickable event, as an object selection, or as a similarly captured user event, such as tapping a button object with a stylus on a touch-sensitive WPDA screen.

Referring again to FIG. 5 (step 76), once the XML document is completely parsed and the Document Tree 305 has been populated with the application data, the Application Handler 302 passes a handle for the document's root node to the Script Handler 307. The Script Handler 307 analyzes the document using methods offered by the Document Tree 305 (established by the document object model) and each named component is registered with the Script Engine 308 along with its unique tree node ID.

In the preferred embodiment of the AVM, the Script Handler 307 searches the document tree for an element named "<script>", and then submits the script element to the Script Engine 308 which parses the script element, registers each of its individual functions within the Script Engine 308, and identifies each function as belonging to that application.

As shown in FIG. 8, in an alternate embodiment of the AVM, instead of a single "<script>" element containing free-form ECMAScript text that must be parsed by a Script Engine 308, the XML files contain structured scripting logic definitions in other elements referred to as Tasklists 602 and Tasks 603. Tasklists 602 contain a named, ordered list of one or more Tasks 603 and/or nested Tasklists 602. Tasks 603 may be of three types: Client Tasks 605, Conditional Tasks 606, and Host Tasks 607. The Client Tasks 605 are operations performed strictly on the client device. Conditional Tasks 606 are special locally executed tasks that implement "if/then/else" program logic. Finally, Host Tasks 607 are performed on a server and involve communicating with the web server and middleware software over a network such as the Internet or a local area network (LAN).

The Host Tasks 607 cause specified programs or procedures on the server to be executed, with any number of parameters which are also included in the server request as name/value pairs. Data and commands received from the server in response to a Host Task 607 are used to execute further program logic on the client device. This further program logic may include the display of information to the end user and/or the invocation of any other methods that can be used in a Client Task. Tasklists are executed by the AVM when an event occurs to which they are linked. Tasklists may also be invoked by either client applications or server programs using a special method named "invoke Task List. In this alternate embodiment, for each application loaded in the Document Tree 305, the AVM constructs a Tasklist Table 601 (list of Tasklists 602) and a Task Table 604 (list of Tasks 603) from the task and tasklist information parsed from each XML file. Each Tasklist 602 has an ordered list of any number of Tasks 603 and/or nested Tasklists 602. Each Task Table 604 has a list of Tasks 603 of three possible types: Client Tasks 605, Host Tasks 606 and Conditional Tasks 607. Tasks 603 may have any number of Task Parameters 608 which contain either constant values or which specify the name of another Client Task 605 that must be run to obtain a value for the Task Parameter 608 as needed.

Referring again to FIGS. 4 an 5 (specifically, reference numerals in FIG. 4 and step 78 in FIG. 5), when the Script Handler 307 finishes the above operations the Application Handler 302 queries the Script Handler 307 for the existence of a script function named "init" belonging to the application being initialized. If a function named "init" exists, the AVM Manager 301 submits a request to the Script Handler 307 to invoke that function. The Script Handler 307 then executes the "init" function using the methods exposed by the Script Engine 308 and concludes the instantiation process by returning control to the AVM Manager 301, which then waits for user interactions and component events triggered by those user interactions.

The "init" function usually contains a reference to a frame element 411 in the Document Tree 305 and specifies a "SetVisible(true)" method, making that frame and the components it contains visible to the application user. The SetVisible operation is carried out by the Frame Factory 501 (shown in FIG. 6) when the Script Engine 308 invokes the SetVisible method of the Frame Factory 501 with parameters that include the tree node ID of the frame element 411 identified in the script. The Frame Factory 501 queries the Document Tree 305 to obtain the name of the Layout Handler 313 that is specified in the layout element 431 of that frame, and requests a handle to that Layout Handler 313 from the AVM Manager 301. The Frame Factory 501 then invokes a layout method of that Layout Handler 313 by passing a reference to the tree node ID of the frame being made visible.

Each visual component in the Document Tree 305 has a corresponding set of layout properties that describe its size and placement relative to other objects within its container. These layout properties are analyzed by a Layout Handler 313 that has the ability to manipulate the boundaries of each object and position them exactly as originally specified by the application developer. The Layout Handler 313 implements the "Gridbag Layout" system as specified in the Java programming language standards, which is well-documented by its author, Sun Microsystems, as well as in many other articles and books.

Certain specialized types of Components, referred to as "container" components, can contain other components and containers in an X/Y grid layout coordinate system (the "Gridbag Layout"). One of these containers, the frame component, is a master container that has a SetVisible method that is used to determine whether this is the first time the frame is being made visible. If so, then it asks the Layout Handler 313 to lay out (position) all of its components. Some of these components may also be containers, and each sub-container will then ask the Layout Handler 313 to lay out its components (and so on, recursively, to an arbitrary level of nesting).

The first time a particular frame is made visible the Layout Handler 313 makes three passes through the specified frame node's branches, using tree node enumeration methods exposed by the Document Tree 305. The first pass determines the preferred size of each visible element and stores the size values in attribute nodes of each element within the Document Tree 305. The second pass through the tree evaluates the element sizes in relation to the other elements contained by the frame. Adjustments to the element sizes are made with respect to certain layout properties assigned to each element and with respect to the size of the display. The third pass through the frame's nodes is performed to create the visible components within the frame as well as the visible frame itself.

As each node is encountered on the third pass a call is made to the Component Factory Manager 306 to render a visible component. The Component Factory Manager 306's rendering method receives the tree node ID as a parameter, which allows it to query the element type, its properties, and layout dimensions. The Component Factory Manager 306 uses the parameter information to call the appropriate one of the Component Factories 314 shown individually in FIG. 6, (according to element type) to render the specified component.

Subsequent requests to make that particular frame visible do not require the first two passes through the frame's nodes since the size of each element has already been calculated and stored into persistent memory. Consequently, the frames are rendered quickly, even on devices that have limited processing power.

Some visual objects within a visible frame may require certain media files, such as an image, which is designated in the element's attributes held by the Document Tree 305. Any required media file is downloaded from the Image Files 145 on the Network Server(s) 131 (or retrieved from a local cache if previously downloaded during this execution session) by the HTTP Handler 310 as the visual object is being rendered.

The AVM displays the various visual components within a frame with a look and feel that is native for the client operating system platform on which it is installed. Because the GUI component specifications in the XML Files 144 are platform-neutral, the same XML file can be executed by different embodiments of the AVM and result in a different visual appearance. Since the GUI component specifications are platform-neutral, one set of XML files can be used in an application that is run on a variety of PC and WDPA devices, without having to develop a separate set of programs for each type of device. Though a single set of XML files is used on a variety of PC and WPDA devices, the AVM presents the user with the appropriate look and feel for the device being used.

Figure 9:
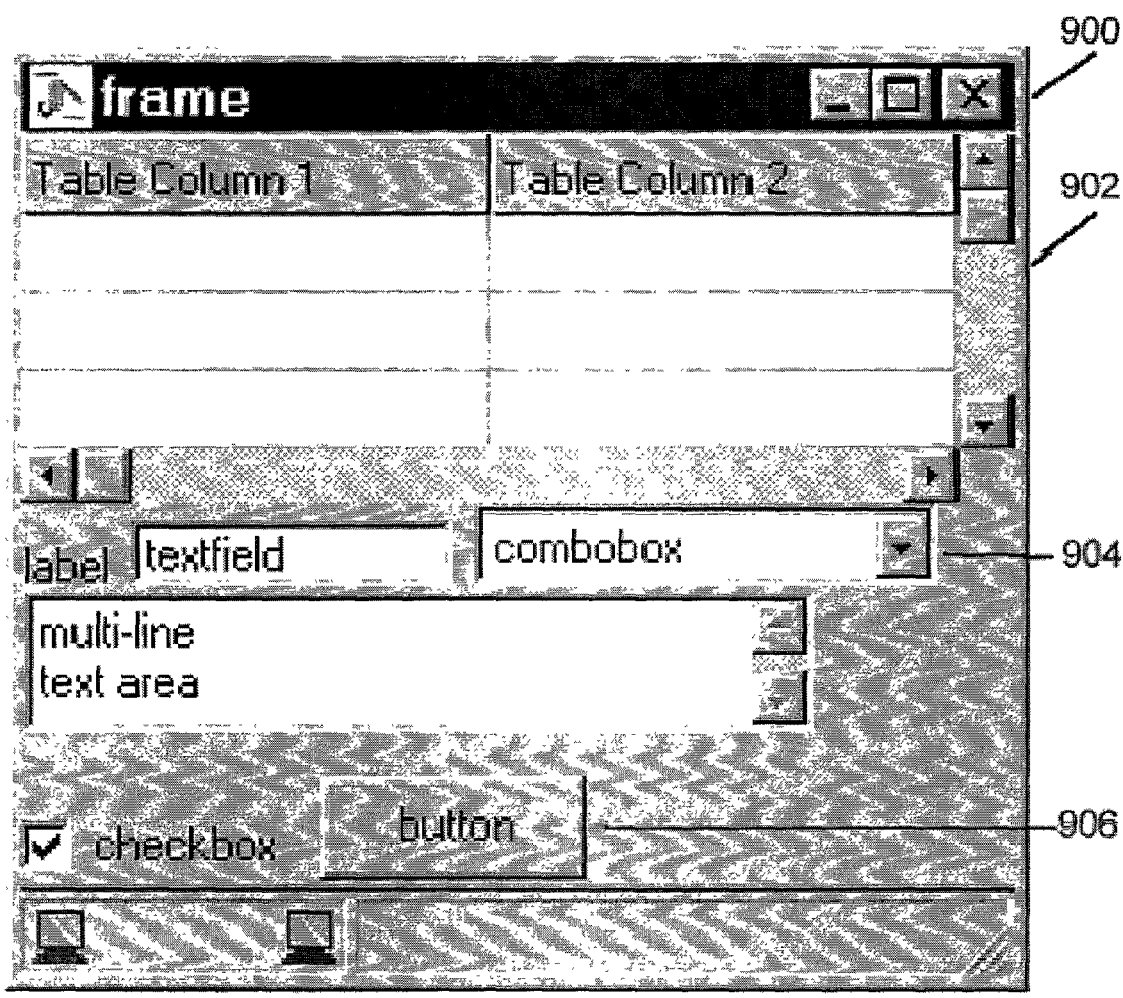
FIG. 9 is a screen snapshot of a sample application deployed and implemented by the AVM on a Windows PC, illustrating how the AVM creates various graphical components with a native look and feel for a Windows PC.

As shown in FIG. 9, the various visual components in this grayscale screen snapshot of a sample application that is being executed by an embodiment of the AVM on a Windows PC have the same visual appearance as is usually found in most other software used on a Windows PC. On the right edge of the frame component title bar 900 are the three minimize, maximize and close buttons normally found in any frame (or window) of a typical Windows program. The grid (or table) component 902 similarly has a typical Windows appearance, including the shape of the horizontal and vertical scroll bars. The combobox component 904 has the normal Windows appearance including the button with a down-arrow that is used to "drop down" the list of choices for this component. Button component 906 has a rectangular shape like typical Windows buttons.

Figure 10:
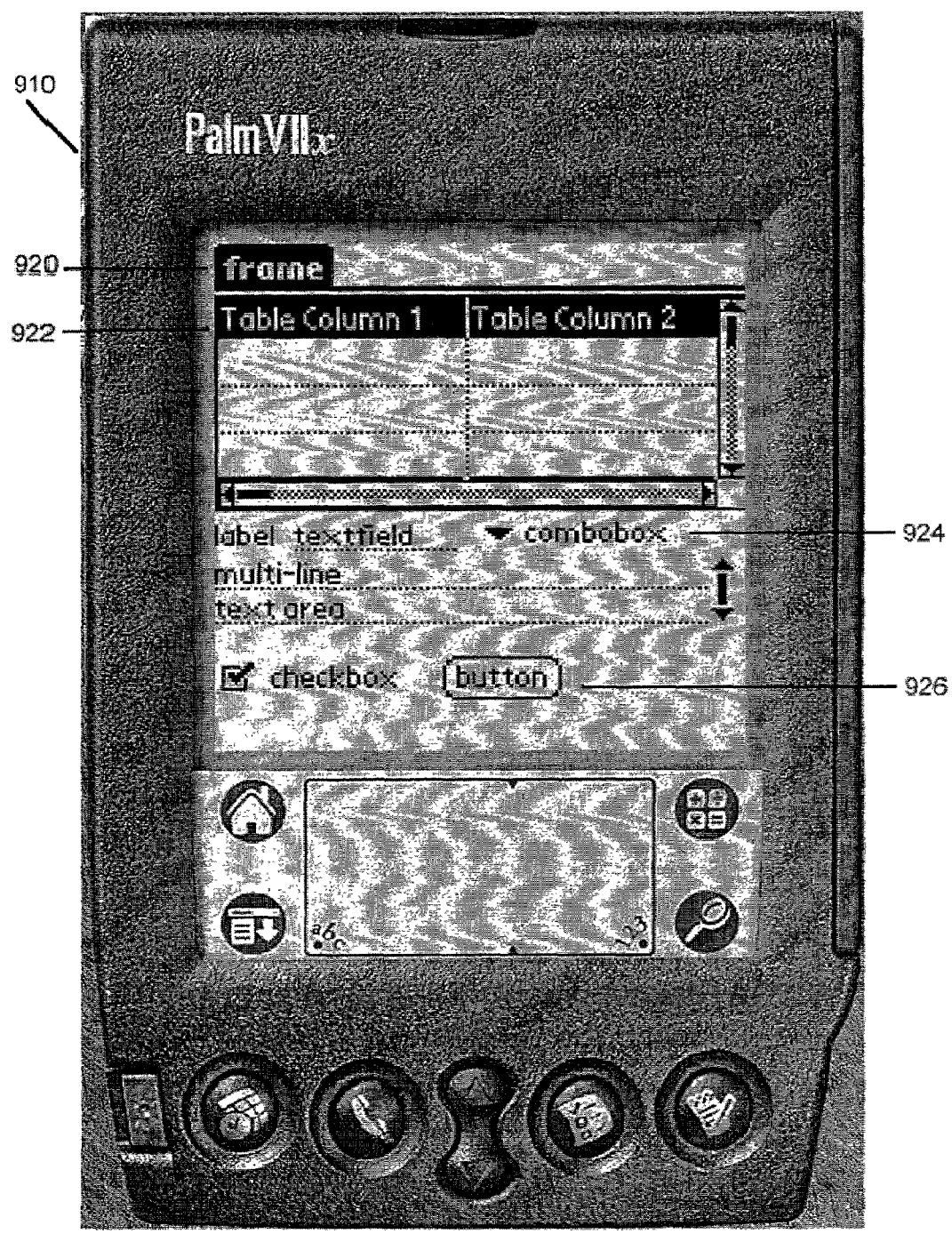
FIG. 10 is a screen snapshot of a sample application deployed and implemented by the AVM on one example of a PalmOS-based WPDA, a Palm VIIx. It illustrates how the AVM creates the same graphical components as in FIG. 9 with a native look and feel for Palm WPDAs.

In FIG. 10, the same visual components are shown in a grayscale screen snapshot of the application being executed by an embodiment of the AVM for a Palm-OS based WPDA device. This snapshot shows how the application appears when executed on a Palm VIIx device 910, which is only one of many possible brands and models of WPDA devices on which the AVM may be used. Frame component title bar 920 does not have any buttons on the right, since the standard appearance of a frame or window in the Palm OS does not use them, unlike in the Windows frame example above. Similarly, the appearance of the scrollbars and row separator lines in grid (table) component 922 have the appearance normally found in other PalmOS programs, different than the normal appearance in Windows. Combobox component 924 has the button with a down-arrow at the left of the text portion, which is the PalmOS standard. Button component 926 has rounded corners that are similarly the standard PalmOS button appearance.

Similarly, embodiments of the AVM for WPDA devices that use other operating systems, such as the Windows CE operating system, display GUI components with the native look and feel appropriate to such other operating system.

Figure 11:
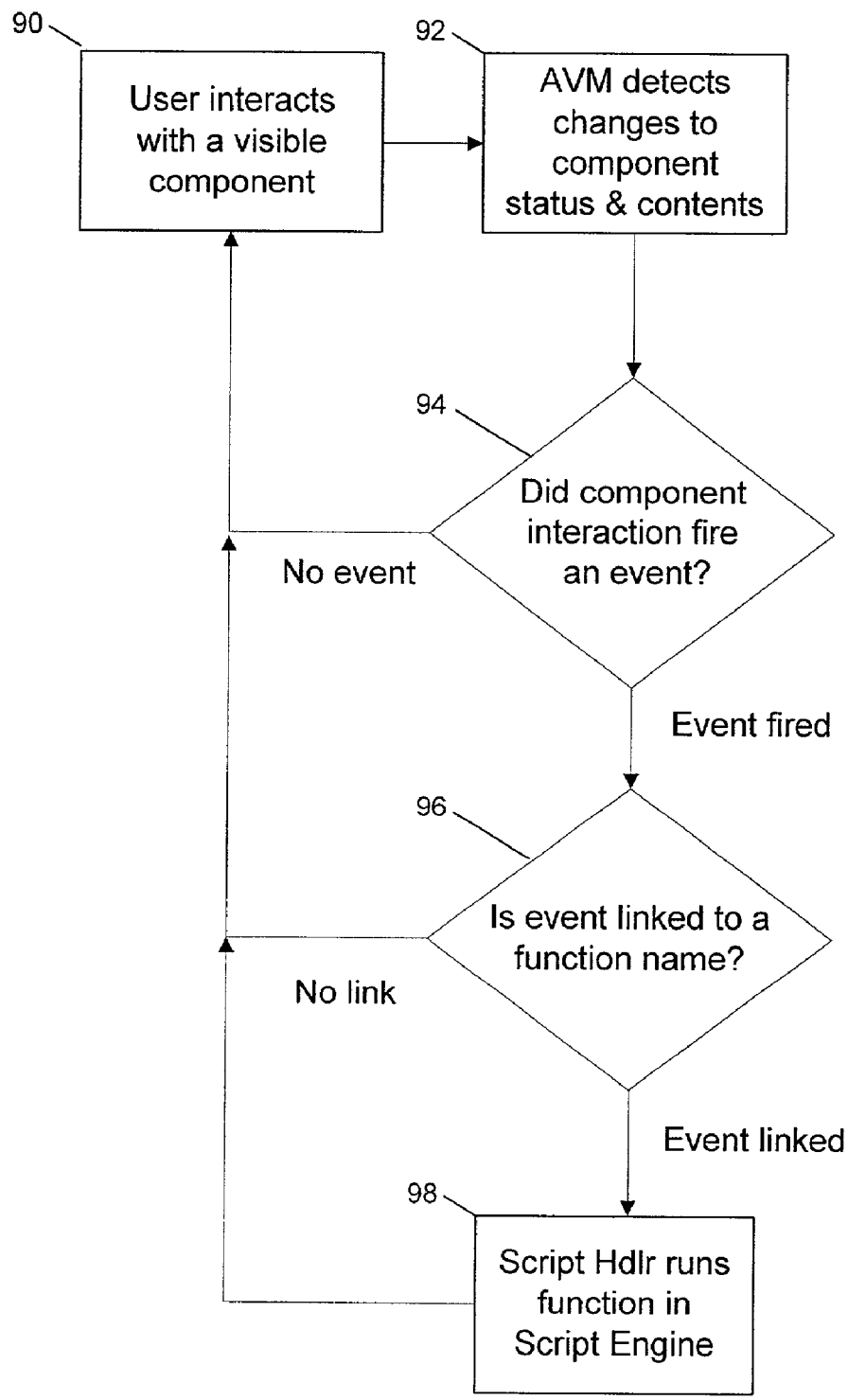
FIG. 11 is a flow diagram showing the steps in the process of executing an application within the present invention on a Windows PC.

As shown in FIG. 11 (and using reference numerals shown in FIG. 4), once the AVM has been installed and initialized and once the Factory Manager 306 has rendered the visible components, the user of the application can interact with the visible frame by entering data into text components, selecting values from list components, pressing buttons, and the like, depending on which objects or components are included in the frame (step 90). As the user interacts with components, the AVM 221 detects, in a platform dependent way, changes to the visual appearance of the component that reflect the entry of data, the selection of a choice, putting focus on a component, and the like (step 92). The AVM 221 updates the current data content and other state information for the component within the Document Tree 305 to reflect such changes. Certain of these components also "fire" (or trigger) events when utilized in a certain manner, as specified in the Application Schema Repository 312. The Script Handler 307 listens for events generated by the user interface (step 94). When an event occurs the Script Handler 307 obtains the name of the event source in a platform dependent way and queries the event source element via the Document Tree 305, looking for a function name that has been associated with that event (step 96). If there is a function bound to a particular event of that element, then the Script Handler 307 submits a request to the Script Engine 308 to invoke that function (step 98). When the Script Engine has completed execution of that function, the above process continues with the next user interaction, until a function is executed requesting the System Handler 315 to exit (end) the AVM session.

The script modules that make up functions may contain references to the visual components that make up the application, as well as to a number of non-visual objects. These references exist to invoke the methods that expose the visual components and that render these objects visible. Functions may also have references to "global" components, which are always available to any and all applications loaded and running within the AVM. The two global components currently available on all platforms are the System Handler 315 and the RPC Handler 309. On some platforms supported by the AVM, a Database Handler 316 also exists.

On all implementations of the AVM, the System Handler 315 provides methods to display a message box and a warning box, and a method to exit from the AVM. These methods are implemented by making calls to standard methods of the Client Device Operating System 321. Additional methods are available on some platforms to query certain information and to perform tasks that are unique to the operating system, such as the ability to interface the AVM to Microsoft Office software products on a Windows PC or on a WPDA that uses the Windows CE operating system.

The RPC Handler 309 is designed to facilitate communications between the AVM and a variety of HTTP servers across TCP/IP networks including the Internet. The RPC Handler 309 has generic methods that allow the developer to construct URL requests that conform to any type of middleware that makes itself available to HTTP clients. These URL requests specify domain, host, path, program, and parameter information needed to invoke remote procedures. These remote procedures return a result set, which is then managed by the RPC Handler 309. The AVM has a published method invocation protocol that allows remote procedures to invoke certain methods exposed by the AVM's components and component factories.

Generally, the AVM 221 uses a flexible URL construction methodology to communicate with a variety of middleware software products on a separate server computer over a local area network or over the Internet, using standard HTTP and TCP/IP protocols. The AVM 221 communicates with Middleware software products 151 via a Web Server 141 on the Network Server(s) 131. The Middleware products 151 currently supported in a representative embodiment include the WebSpeed and AppServer products from Progress Software Corporation of Bedford, Mass. the Jargon Tunnel Broker product (which acts as a front-end interface to the Progress AppServer product) from Jargon Software of Minneapolis, Minn. (the assignee of the present invention), and the WebDB and Oracle Application Server products from Oracle Corporation of Redwood Shores, Calif. The RPC Handler 309 is designed so that interfaces to other Middleware 151 products may be easily implemented by application software developers with only a few lines of script programming.

Some platforms offer a global Database handler 316 component that allows the user to access data from a local Database on Client Device 331. The Database Handler 316 exposes a set of scriptable methods for storing, retrieving, and manipulating records managed by a database system. Current implementations of the Database Handler 316 offer methods based on the ODBC standard for invoking SQL based queries.

As discussed above, the present invention teaches a system and method for deploying and maintaining client applications in a distributed environment. In the preferred embodiment, the AVM 221 is downloaded automatically through a web browser when the user visits a web site. The AVM is preferably compressed or zipped to a size of approximately 200 KB. The AVM installs itself on the client device. The AVM then assembles an application by parsing and using XML code in text documents stored on a server to derive and implement a GUI interface having powerful functionality, determined by the parsed XML code. Each time the user visits the web site, the most current version of the requested application is assembled on the fly.

The AVM provides a downloadable executable that downloads and installs quickly, even over slow network connections. The GUI provides an interface that is standard to the client device, reducing or eliminating the need for any special knowledge, training or installation activities by the end users. The automatic deployment feature significantly reduces installation overhead, and the on-the-fly assembly of the most recent application version permits administrators to upgrade software at the server level, virtually eliminating upgrade related costs and issues. Since the software is installed and instantiated from within a standard web browser, custom software costs are minimized, and the costs required for server computer hardware and software are significantly reduced. Finally, the AVM allows for one set of software to be implemented on all platforms and for both internal use and Internet use.

Additionally, while the present invention has largely been described with respect to personal computers and wireless personal digital assistants, the invention can also be implemented on the MacIntosh computer, on non-wireless, web-enabled personal digital assistants, on web enabled telephones, or any other web enabled device. Once the platform or operating specific AVM is available, all other elements of the application function on the device according to the device's normal look and feel. Additionally, a single AVM is required to run any number of applications, because the AVM is not application program logic specific, but rather operating system specific. Thus, the AVM provides a solution for deploying applications over a distributed network to a variety of platforms as described above.

Finally, the applications for the present invention are without limit. The AVM can be used to implement a fully functioning database application for accessing a datafile remotely. Specifically, the AVM can be used to assemble the user interface for accessing almost any database architecture, including Oracle, Sybase, Progress, Microsoft Access, Microsoft SQL Server, or any other known database structure. Additionally, within a software development environment, the AVM can be used to test new software. Specifically, software applications can be modified on the fly without reinstallation simply by replacing text files containing embedded application program logic on the server. These examples are provided by way of illustration only.

Although the present invention has been described with reference to preferred embodiments, workers skilled in the art will recognize that changes may be made in form and detail without departing from the spirit and scope of the invention.

The invention claimed is:

1. A system for deploying applications over a distributed network to an Internet-enabled device for interacting with a server, the server being in communication with the distributed network and having text files containing program logic, the system comprising:
   an application assembler for storing on and running on the Internet-enabled device, the application assembler for downloading one or more text flies from the server, retrieving the program logic from each of the downloaded text files, and assembling the retrieved program logic into a functioning application and running the functioning application on the Internet-enabled device, wherein the functioning application provides a graphical user interface for receiving and interpreting user inputs to the Internet-enabled device.

2. The system of claim 1, wherein the application assembler is operating system dependent.

3. The system of claim 1, wherein the program logic is operating system independent.

4. The system of claim 1, wherein the functioning application processes the user inputs and interacts with a local or remote database, or both, for performing user instructions.

5. The system of claim 1, the application assembler comprising:
   a parser for extracting program logic from text files stored on the server;
   a script engine for interpreting scripts contained in the extracted program logic, and for providing methods to invoke script functions; and
   component handlers for rendering visual components and for processing operations specific to the visual components.

6. The system of claim 5, wherein the application assembler further comprises:
   a layout handler for analyzing positioning properties of a group of components and translating them into component dimensions and coordinates for display on each web enabled device.

7. A system for deploying an application over a network to an Internet-enabled device, the network having a server containing one or more application logic files, the application logic files containing embedded application logic relating to a computer program, the system comprising:
   a program assembler for storing on and running on the Internet-enabled device, the program assembler for downloading the application logic files, retrieving the embedded application logic from the application logic files, and building the computer program from the retrieved embedded application logic, and running the computer program on the Internet-enabled device, wherein the computer program provides a graphical user interface for receiving and interpreting user inputs to the Internet-enabled device.

8. The system of claim 7, further comprising:
   a plugin for installation in a web-browser for running the program assembler according to instructions embedded in an Internet web page.

9. The system of claim 7, wherein the program assembler is operating system dependent, the program assembler for assembling multiple computer programs based on the embedded application logic.

10. The system of claim 7, wherein the program assembler is operating system dependent, and wherein at least two different program assemblers for at least two different operating systems on two different Internet-enabled devices use the embedded application logic from the text files for building a computer program having the same functionality on both Internet-enabled devices.

11. The system of claim 7, wherein the embedded application logic is operating system independent.

12. The system of claim 7, wherein the Internet-enabled device is selected from a group consisting of to computers, workstations, personal digital assistants, wireless personal digital assistants, and Internet-enabled phones.

13. The system of claim 7, wherein the application logic files are compressed.

14. A method for deploying a computer program over a network, the method comprising:
   storing and running a software module on a client device of a user;
   providing to the client device text files containing embedded program logic for the software module to assemble into the computer program, wherein the computer program provides a graphical user interface for receiving and interpreting user inputs to the client device;
   running the computer program assembled from the embedded program logic on the client device; and
   enabling user interaction with the computer program running on the client device.

15. The method of claim 14, wherein the step of hosting comprises:
   storing a compressed file in a standard compression format on a server in communication with a network, the compressed file for automatic download and installation on the client device trough a web browser.

16. The method of claim 14, wherein the step of providing text files comprises:
   storing text files on a server in communication with a network, the text files containing embedded program logic.

17. The method of claim 16, wherein the text files are compressed.

18. The method of claim 14, and further comprising:
   hosting a web page containing a software module and a plugin on for installation on a client device of a user; and
   launching the installed software module using the installed plugin based on instructions embedded within the web page.

19. The method of claim 18, wherein the step of launching the installed software module comprises:
   embedding a launch instruction in a starter web page on the network.

* * * * *

UNITED STATES PATENT AND TRADEMARK OFFICE
CERTIFICATE OF CORRECTION

PATENT NO.        : 7,246,351 B2
APPLICATION NO.   : 10/081921
DATED             : July 17, 2007
INVENTOR(S)       : Timothy J. Bloch et al.

It is certified that error appears in the above-identified patent and that said Letters Patent is hereby corrected as shown below:

Column 2, Line 35, delete "maybe", insert --may be--

Column 22, Line 58, delete "flies", insert --files--

Column 24, Line 6, delete "of to", insert --of--

Signed and Sealed this

Twentieth Day of November, 2007

JON W. DUDAS
*Director of the United States Patent and Trademark Office*